United States Patent
Sebastian et al.

(10) Patent No.: US 11,244,322 B2
(45) Date of Patent: Feb. 8, 2022

(54) METHODS AND APPARATUS FOR CHARGEBACKS OF PUSH PAYMENT TRANSACTIONS

(71) Applicant: MASTERCARD INTERNATIONAL INCORPORATED, Purchase, NY (US)

(72) Inventors: Smita Sebastian, Scarsdale, NY (US); Pablo Fourez, White Plains, NY (US); Mary K Rechert, Lake St. Louis, MO (US); Jeanne B Moore, Webster Groves, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 16/133,892

(22) Filed: Sep. 18, 2018

(65) Prior Publication Data

US 2020/0090180 A1 Mar. 19, 2020

(51) Int. Cl.
*G06Q 20/40* (2012.01)
*G06Q 20/34* (2012.01)

(52) U.S. Cl.
CPC ......... *G06Q 20/407* (2013.01); *G06Q 20/351* (2013.01)

(58) Field of Classification Search
CPC ... G06Q 20/027; G06Q 20/407; G06Q 20/351
See application file for complete search history.

(56) References Cited

U.S. PATENT DOCUMENTS

| | | | |
|---|---|---|---|
| 6,704,714 B1 | 3/2004 | O'Leary et al. | |
| 9,218,599 B1* | 12/2015 | Hilbring | G06Q 20/407 |
| 2002/0077978 A1 | 6/2002 | O'Leary et al. | |
| 2012/0016799 A1* | 1/2012 | Killian | G06Q 20/40 |
| | | | 705/44 |
| 2013/0317984 A1 | 11/2013 | O'Leary et al. | |
| 2014/0214649 A1* | 7/2014 | DuCharme | G06Q 20/108 |
| | | | 705/39 |
| 2016/0034889 A1* | 2/2016 | Downs | G06Q 20/382 |
| | | | 705/26.41 |
| 2016/0379216 A1* | 12/2016 | Wang | G06Q 20/407 |
| | | | 705/44 |

(Continued)

FOREIGN PATENT DOCUMENTS

WO 00/67216 A1 11/2000

OTHER PUBLICATIONS

Pymnts, "Zelle Eyeing Expansion Into Small Business Payments", PYMNTS.com, Aug. 16, 2018. (Year: 2018).*

(Continued)

*Primary Examiner* — Abdulmajeed Aziz
(74) *Attorney, Agent, or Firm* — Buckley, Maschoff & Talwalkar LLC

(57) ABSTRACT

A method includes associating a virtual card number (VCN) with an account owned by a customer. The VCN is in a format used for account numbers in a payment card system. The account is not a payment card system account. After a P2M (person to merchant) push payment transaction funded by the account, a request is received from the customer to perform a chargeback with respect to the P2M transaction. A message is transmitted to execute the requested chargeback. The message includes the VCN.

3 Claims, 8 Drawing Sheets

(56) References Cited

U.S. PATENT DOCUMENTS

2017/0200155 A1* 7/2017 Fourez ................ G06Q 20/385
2018/0158042 A1* 6/2018 Finch ................. G06Q 20/4014
2019/0303910 A1* 10/2019 Asbe ................. G06Q 20/3221

OTHER PUBLICATIONS

Koury, "Two strangers united by a mistaken electronic payment using Zelle", ABC7News, Jul. 20, 2018. (Year: 2018).*
"PCT Search Report and Written Opinion", International Searching Authority, dated Nov. 7, 2019 (Nov. 7, 2019), for International Application No. PCT/US2019/044079, 7pgs.

* cited by examiner

METHODS AND APPARATUS FOR CHARGEBACKS OF PUSH PAYMENT TRANSACTIONS

BACKGROUND

FIG. 1 is a block diagram that illustrates a conventional payment system 100.

The system 100 includes a conventional customer device 102 presented by the customer at the point of sale. The customer device 102 may be a typical payment device, such as a magnetic stripe card, an IC (integrated circuit) card, a fob, a payment-enabled smartphone, etc.

The system 100 further includes a merchant device 104. In some known manner (depending on the type of customer device 102) a reader component (not separately shown) of the merchant device 104 is capable of reading the payment account number and other information from the customer device 102.

The merchant device 104 may be located at the premises of a retail store and operated by a sales associate of the retailer for the purpose of processing retail transactions. The customer device 102 may interact with the merchant device 104 for the purpose of executing such a transaction.

A computer 106 operated by an acquirer (acquiring financial institution) is also shown as part of the system 100 in FIG. 1. The acquirer computer 106 may operate in a conventional manner to receive an authorization request for the transaction from the merchant device 104. The acquirer computer 106 may route the authorization request via a payment card network 108 to the server computer 110 operated by the issuer of a payment account that is associated with the customer device 102. As is also well known, the authorization response generated by the payment card issuer server computer 110 may be routed back to the merchant device 104 via the payment card network 18 and the acquirer computer 106.

One well known example of a payment card network is referred to as the "Banknet" system, and is operated by Mastercard International Incorporated, which is the assignee hereof.

The payment account issuer server computer 110 may be operated by or on behalf of a financial institution ("FI") that issues payment accounts to individual users. For example, the payment account issuer server computer 110 may perform such functions as (a) receiving and responding to requests for authorization of payment account transactions to be charged to payment accounts issued by the FI; (b) tracking and storing transactions and maintaining account records; (c) rendering periodic account statements; and (d) receiving and tracking payments to the issuer from the account holders.

The components of the system 100 as depicted in FIG. 1 are only those that are needed for processing a single transaction. A typical payment system may process many purchase transactions (including simultaneous transactions) and may include a considerable number of payment account issuers and their computers, a considerable number of acquirers and their computers, and numerous merchants and their POS (point of sale) devices. The system may also include a very large number of payment account holders, who carry payment cards or other devices for initiating payment transactions by presenting an associated payment account number to the merchant device.

In a further development, payment systems like that shown in FIG. 1 have been adapted to minimize the investment by merchants in equipment to be installed at the point of sale. To this end, it has been proposed and implemented for the merchant to display a fixed or variable QR code to be scanned by a payment-enabled mobile device carried by the customer. In response to scanning the QR code, the customer's mobile device (via a payment app running therein) contacts the customer's account issuer to initiate a push payment transaction to benefit the account of the merchant. The merchant is notified of the successful execution of the push transaction, and the customer may then leave with goods that are the subject of the purchase transaction at the point of sale.

The present inventors have now recognized opportunities to make QR-based or similar push payment P2M (person-to-merchant) systems and other payment systems more functional from the point of view of purchasers and their financial institutions.

BRIEF DESCRIPTION OF THE DRAWINGS

Features and advantages of some embodiments, and the manner in which the same are accomplished, will become more readily apparent with reference to the following detailed description taken in conjunction with the accompanying drawings, which illustrate exemplary embodiments, wherein.

DETAILED DESCRIPTION

Figure 1:
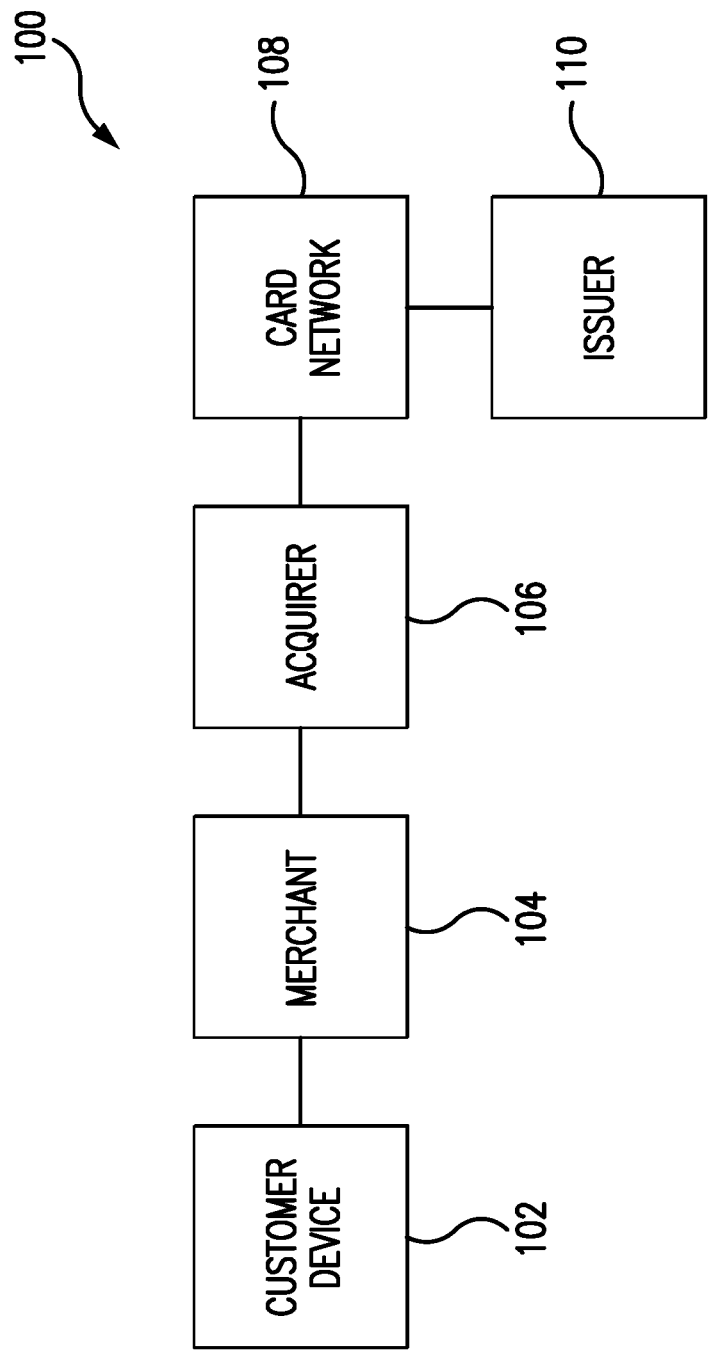
FIG. 1 is a block diagram illustrating a payment card account system.

In general, and for the purpose of introducing concepts of novel embodiments described herein, payment card network "rails" are provided to facilitate chargeback transactions in relation to P2M push payment transactions. Where the user's funding account is not a payment card network account, a virtual card number (VCN) is associated with the user's funding account and is used in connection with the chargeback transaction. The rails may also support a re-presentment transaction by the merchant's bank.

With a flexible capacity for chargeback transactions, the proposed system may make P2M payments more attractive to, and convenient for, system users and their banks.

Throughout this disclosure, examples of financial transactions will be described, which are not to be taken as limiting. In addition, a number of terms will be used, the use of which terms is not intended to be limiting, but rather the terms are used for convenience and ease of exposition. For example, as used herein, the term "user" may be used interchangeably with the term "consumer" and/or the with the term "cardholder" and/or with the term "customer" and these terms are used herein to refer to a person, individual, consumer, customer, company, business or other entity that owns (or is authorized to use) a financial account such as a bank account (i.e., a savings account and/or a checking account) or payment card account (i.e., a credit card account, debit card account, or pre-paid card account) or some other type of financial account (such as a brokerage account, loyalty card account, and/or mass transit access account). In addition, the term "payment card account" may include a credit card account, a debit card account, and/or a deposit account or other type of financial account that an account holder or cardholder may access. The term "payment card account number" includes a number that identifies a payment card system account or a number carried by a payment card, and/or a number that is used to route a transaction in a payment system that handles debit card and/or credit card transactions and the like. Moreover, as used herein the terms "payment card system" or "payment card account system" refer to a system and/or network for processing and/or handling purchase transactions and related transactions, which may be operated by a payment card system operator such as Mastercard International Incorporated (the assignee hereof), or a similar system. In some embodiments, the term "payment card system" may be limited to systems in which member financial institutions (such as banks) issue payment card accounts to individuals, businesses and/or other entities or organizations (and thus are known as issuer financial institutions or issuer banks). In addition, the terms "payment card system transaction data" and/or "payment card network transaction data" or "payment card transaction data" refer to transaction data associated with payment or purchase transactions that have been or are being processed over and/or by a payment card network or payment card account system. For example, payment card system transaction data may include a number of data records associated with individual payment transactions (or purchase transactions) of cardholders that have been processed over a payment card system or payment card network. In some embodiments, payment card system transaction data may include information such as data that identifies a cardholder, data that identifies a cardholder's payment device and/or payment card account, transaction date and time data, transaction amount data, an indication of the merchandise or services that have been purchased, and information identifying a merchant and/or a merchant category. Additional transaction details and/or transaction data may also be available and/or utilized for various purposes in some embodiments.

Figure 2:
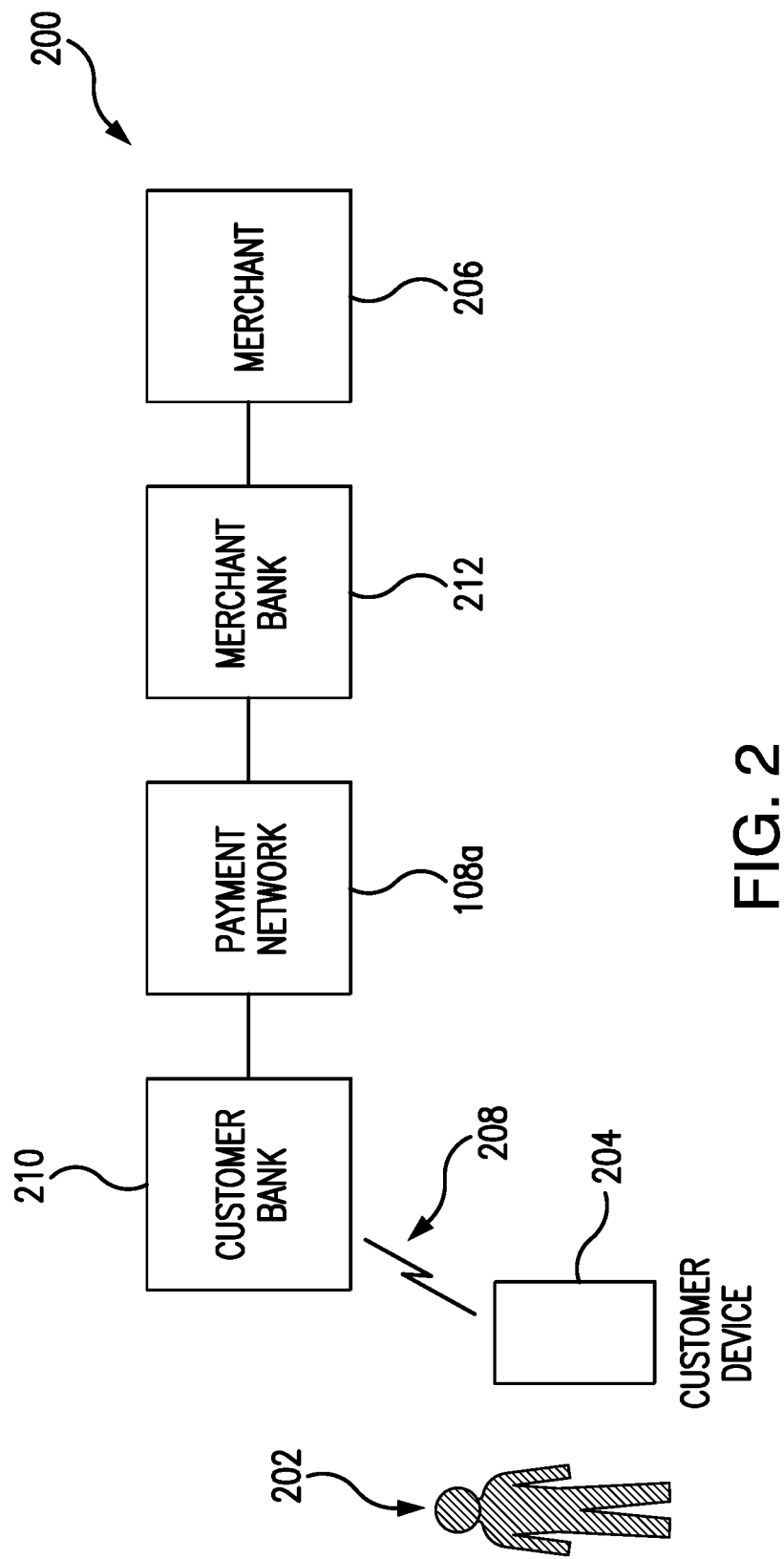
FIG. 2 is a diagram that illustrates a payment transaction system provided according to aspects of this disclosure.

FIG. 2 is a diagram that illustrates a payment transaction system 200 provided according to aspects of this disclosure.

FIG. 2 shows a user/customer 202 of the system 200. The user 202 is shown interacting with a customer device 204, which may be a payment-enabled mobile device owned by the user 202. It is assumed that the user 202 is at a merchant's point of sale (not expressly depicted) and has used the customer device 204 to scan a QR (quick response) code (not shown) presented by the merchant 206 to launch a P2M payment transaction. Launching of the transaction proceeds with over-the-air communication 208 from the customer device 204 to the customer bank 210, at which the funding account for the transaction is held. The customer bank 210 and the merchant bank 212 are linked via a payment card network 108a, to support a push transaction from the user's account to the merchant's account (payment card network account) at the merchant bank 212. The merchant bank 212 notifies the merchant 206 that the payment transaction has been accomplished, and the transaction between the user and the merchant at the point of sale is completed.

A description of a chargeback transaction will be provided below.

The user's funding account may be a payment card network account, or an account that has not been issued in the payment card system. For purposes of subsequent discussion, it is assumed that the funding account is of the latter type, and may be for example a demand deposit account, a mobile money account, or another store of value.

Referring again to FIG. 2, each block therein may generally be taken to represent an indicated entity and/or one or more computer systems operated by the respective entity. Lines connecting blocks in FIG. 2 may be taken to represent data communication channels between computers. In the case of the merchant 206, it is possible that the merchant does not operate a computing device, but may rather hold and use a mobile phone, which need not necessarily be a smartphone. In the transaction illustrated in FIG. 2, the above-mentioned notification to the merchant 206 may be via text message from the merchant bank 212, and block 206 may represent the merchant's mobile phone.

The system components shown in FIG. 2 are only those needed for a single transaction. In a practical embodiment of the payment system 200, there may be many users and their devices, numerous financial institutions acting as either or both of customer banks and merchant banks, and a large number of merchants and their devices.

Figure 3:
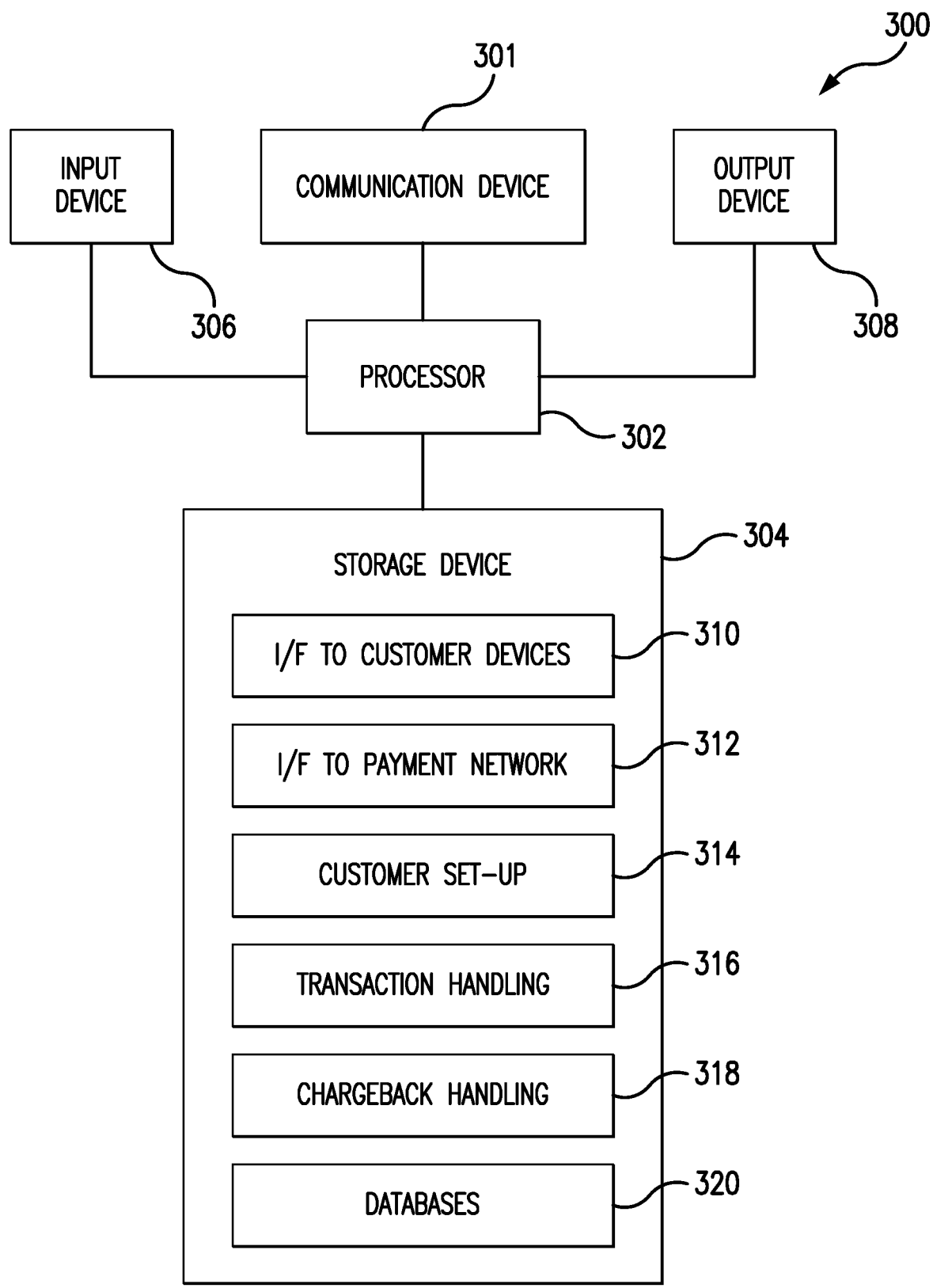
FIG. 3 is a block diagram that illustrates a computer system that may perform functions in the system of FIG. 2.

FIG. 3 is a block diagram of an example computer system 300 that may implement some or all of the functionality ascribed herein to the customer bank 210. As such, the computer system 300 may be referred to as a "customer bank computer."

Referring then to FIG. 3, the customer bank computer 300 may, in its hardware aspects, resemble a typical server computer and/or mainframe computer, but may be controlled by software to cause it to function as described herein. In addition, the customer bank computer 300 may be designed as a special purpose computer, and thus specially configured to perform the functions described herein.

The customer bank computer 300 may include one or more processor(s) 302 operatively coupled to a communication device 301, a storage device 304, an input device 306 and an output device 308. The communications device 301, the storage device 304, the input device 306 and the output device 308 may all be in communication with and/or operably connected to the processor(s) 302. The processor(s) 302 operate to execute processor-executable steps, contained in program instructions described below, so as to control the customer bank computer 300 to provide desired functionality.

Communication device 301 may be used to facilitate communication with, for example, other devices (such as customer devices and the payment network). Communication device 301 may comprise numerous communication ports (not separately shown), to allow the customer bank computer 300 to communicate simultaneously with a number of other computers and/or other devices, including communications as required to simultaneously handle numerous interactions with other devices which may be associated with numerous transactions.

Input device 306 may comprise one or more of any type of peripheral device typically used to input data into a computer. For example, the input device 306 may include a keyboard and a mouse. Output device 308 may comprise, for example, a display and/or an audio speaker, and/or a printer.

Storage device 304 may comprise any appropriate information storage device, including combinations of magnetic storage devices (e.g., hard disk drives), optical storage devices such as CDs and/or DVDs, and/or semiconductor memory devices such as Random Access Memory (RAM)

devices and Read Only Memory (ROM) devices, as well as flash memory and the like. Any one or more of such information storage devices may be considered to be a non-transitory computer-readable storage medium or a computer usable medium or a memory.

Storage device 304 stores one or more programs for controlling the processor(s) 302. The programs comprise program instructions (which may be referred to as computer readable program code means) that contain processor-executable process steps of the customer bank computer 300, executed by the processor(s) 302 to cause the customer bank computer 300 to function as described herein.

The programs may include one or more conventional operating systems (not shown) that control the processor(s) 302 so as to manage and coordinate activities and sharing of resources in the customer bank computer 300, and to serve as a host for application programs (described below) that run on the customer bank computer 300.

The programs stored in the storage device 304 may include, for example, a software interface 310 to facilitate communication between the customer bank computer 300 and customer devices.

Another program that may be stored in the storage device 304 is a software interface 312 to support communication between the customer bank computer 300 and the payment network 108a.

The storage device 304 may also store a customer enrollment and set-up application program 314. The customer enrollment application program 314 may control the processor(s) 302 to enable the customer bank computer 300 to handle enrollment of customers in a push payment service such as was described above.

In addition, the storage device 304 may store a transaction handling application program 316. The transaction handling application program 316 may control the processor(s) 302 to enable the customer bank computer 300 to play its role in push payment transactions such as those described above.

Still further, the storage device 304 may store a chargeback handling application program 318. The chargeback handling application program 318 may control the processor(s) 302 to enable the customer bank computer 300 to play its role in chargeback transactions as described herein and in accordance with the teachings of the present disclosure.

The storage device 304 may also store, and the processor(s) 302 may also execute, other programs, which are not shown. For example, such programs may include communications software and one or more reporting applications. The latter program(s) may respond to requests from system administrators, for example, for reports on the activities performed by the customer bank computer 300. The other programs may also include, for example, web hosting software, device drivers, database management software, and the like.

The storage device 304 may also store one or more databases 320 that may be required for operation of the customer bank computer 300.

It should be understood that other computerized components of the system 200 (FIG. 2) may be constituted by computer hardware having the same types of components and/or hardware architecture as described herein with reference to FIG. 3.

Figure 4:
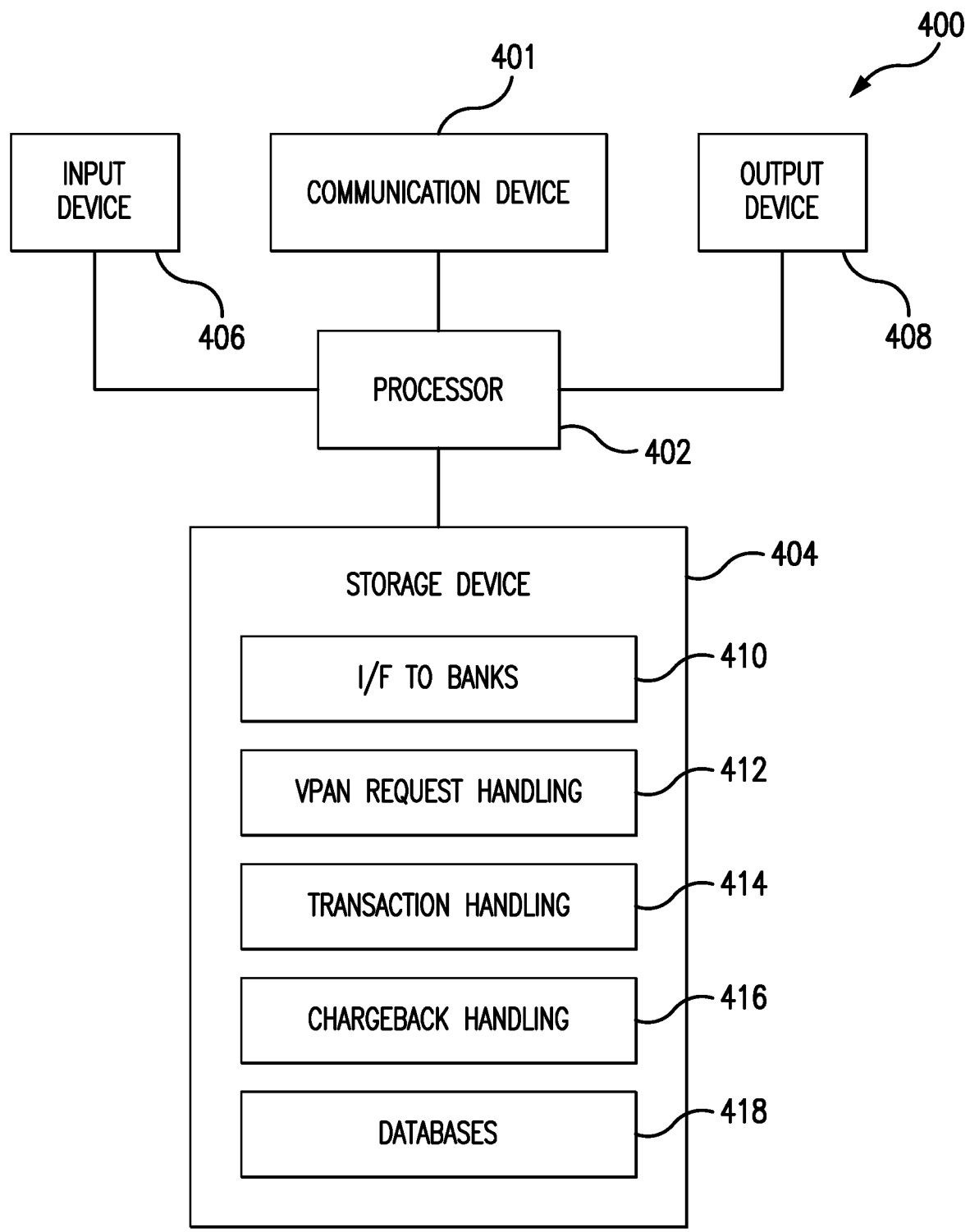
FIG. 4 is a block diagram that illustrates another computer system that may perform functions in the system of FIG. 2.

FIG. 4 is a block diagram of an example computer system 400 that may implement some or all of the functionality ascribed herein to the payment network 108a (FIG. 2). As such, the computer system 400 may be referred to as a "payment network computer." The payment network computer 400 may have the same type of hardware architecture and the same kinds of hardware components that were described above in relation to the customer bank computer 300.

Accordingly the payment network computer 400 (as depicted in FIG. 4) may include one or more processor(s) 402 operatively coupled to a communication device 401, a storage device 404, an input device 406 and an output device 408. The communications device 401, the storage device 404, the input device 406 and the output device 408 may all be in communication with and/or operably connected to the processor(s) 402. The processor(s) 402 operate to execute processor-executable steps, contained in program instructions described below, so as to control the payment network computer 400 to provide desired functionality.

Storage device 404 stores one or more programs for controlling the processor(s) 402. The programs comprise program instructions (which may be referred to as computer readable program code means) that contain processor-executable process steps of the payment network computer 400, executed by the processor(s) 402 to cause the payment network computer 400 to function as described herein.

The programs may include one or more conventional operating systems (not shown) that control the processor(s) 402 so as to manage and coordinate activities and sharing of resources in the payment network computer 400, and to serve as a host for application programs (described below) that run on the payment network computer 400.

The programs stored in the storage device 404 may include, for example, a software interface 410 to facilitate communication between the payment network computer 400 and customer and merchant banks.

The storage device 404 may also store an application program 412 that handles requests for VCNs (also referred to as "virtual PANs" or "VPANs") from customer banks, as described herein.

In addition, the storage device 404 may store a transaction handling application program 414. The transaction handling application program 414 may control the processor(s) 402 to enable the payment network computer 400 to play its role in push payment transactions such as those described above.

Still further, the storage device 404 may store a chargeback handling application program 416. The chargeback handling application program 416 may control the processor(s) 402 to enable the payment network computer 400 to play its role in chargeback transactions as described herein and in accordance with the teachings of the present disclosure.

The storage device 404 may also store, and the processor(s) 402 may also execute, other programs, which are not shown. For example, such programs may include communications software and one or more reporting applications. The latter program(s) may respond to requests from system administrators, for example, for reports on the activities performed by the payment network computer 400. The other programs may also include, for example, device drivers, database management software, and the like.

The storage device 404 may also store one or more databases 418 that may be required for operation of the payment network computer 400.

Figure 5:
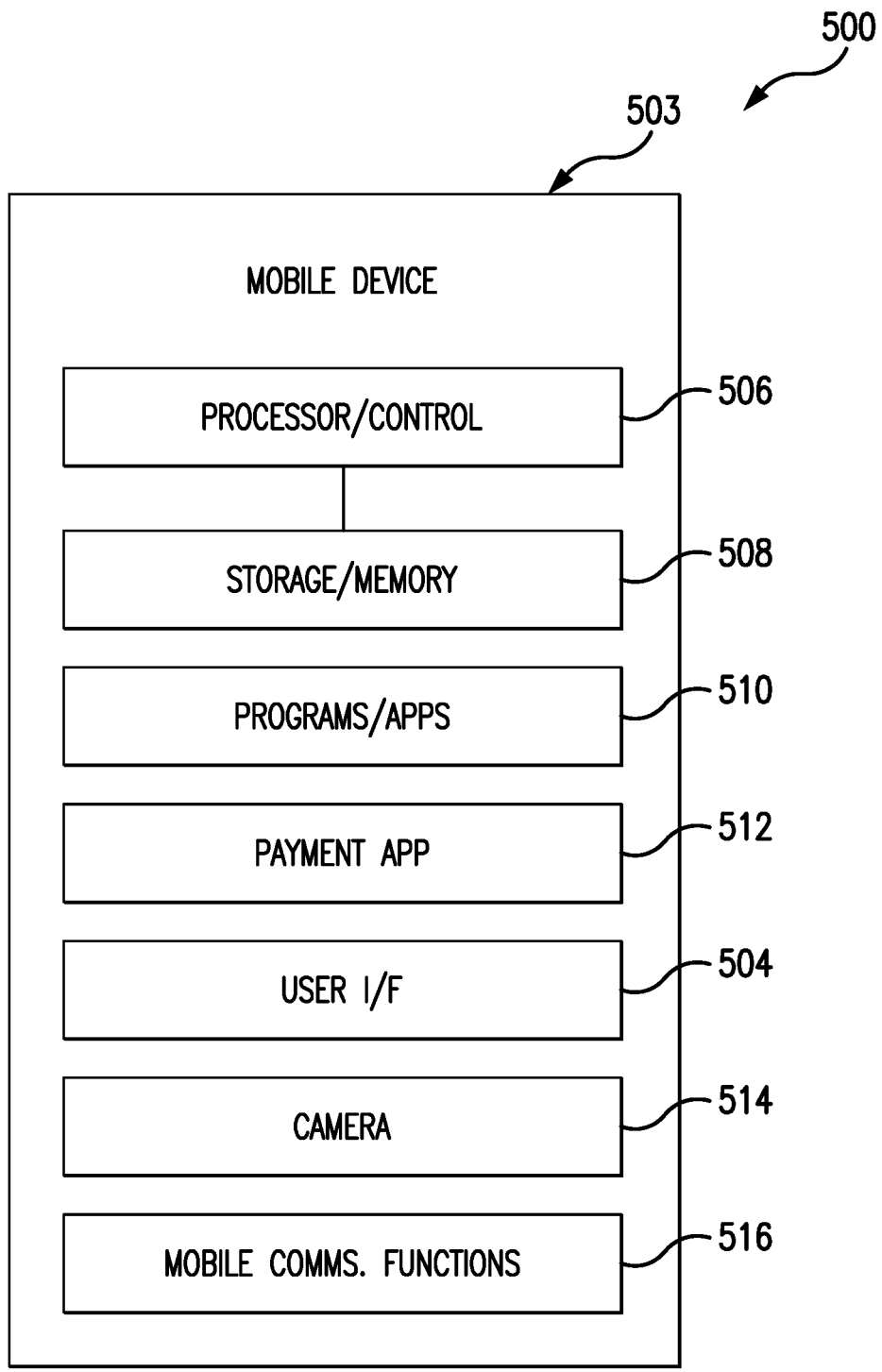
FIG. 5 is a simplified block diagram that illustrates a typical mobile device that may be operated by a user/customer in the system of FIG. 2.

FIG. 5 is a simplified block diagram that illustrates a typical mobile device 500 that may be operated by a user/customer 202 in the payment system 200 of FIG. 2; that is, the mobile device 500 is an example embodiment of the customer device 204 shown in FIG. 2.

Referring to FIG. 5, the mobile device 500 may include a housing 503. In many embodiments, the front of the housing 503 is predominantly constituted by a touchscreen (not separately shown), which is a key element of the user interface 504 of the mobile device 500.

The mobile device 500 further includes a mobile processor/control circuit 506, which is contained within the housing 503. Also included in the mobile device 500 is a storage/memory device or devices (reference numeral 508). The storage/memory devices 508 are in communication with the processor/control circuit 506 and may contain program instructions to control the processor/control circuit 506 to manage and perform various functions of the mobile device 500. As is well-known, a device such as mobile device 500 may function as what is in effect a pocket-sized personal computer (assuming for example that the mobile device is a smartphone), via programming with a number of application programs, or "apps", as well as a mobile operating system (OS). (The apps are represented at block 510 in FIG. 5, and may, along with other programs, in practice be stored in block 508, to program the processor/control circuit 506.)

Because of its particular relevance to the subject matter of this disclosure, one of the apps—namely a payment app—is represented in the drawing as block 512, separate from the other apps 510. The payment app 512 may program the mobile device 500 to perform functionality as required to initiate P2M push payments as described herein.

Block 514 in FIG. 5 represents a digital camera, such as is typically included among the features of a smartphone. As is known, the digital camera 514 may be used to scan a QR code provided by a merchant, thereby obtaining data needed for the processor 506/payment app 512 to initiate a P2M push payment.

As is typical for mobile devices, the mobile device 500 may include mobile communications functions as represented by block 516. The mobile communications functions may include voice and data communications via a mobile communication network with which the mobile device 500 is registered.

From the foregoing discussion, it will be appreciated that the blocks depicted in FIG. 5 as components of the mobile device 500 may in effect overlap with each other, and/or there may be functional connections among the blocks which are not explicitly shown in the drawing. It may also be assumed that, like a typical smartphone, the mobile device 500 may include a rechargeable battery (not shown) that is contained within the housing 503 and that provides electrical power to the active components of the mobile device 500.

It has been posited that the mobile device 500 may be embodied as a smartphone, but this assumption is not intended to be limiting, as mobile device 500 may alternatively, in at least some cases, be constituted by a tablet computer or by other types of mobile computing devices.

Figure 6:
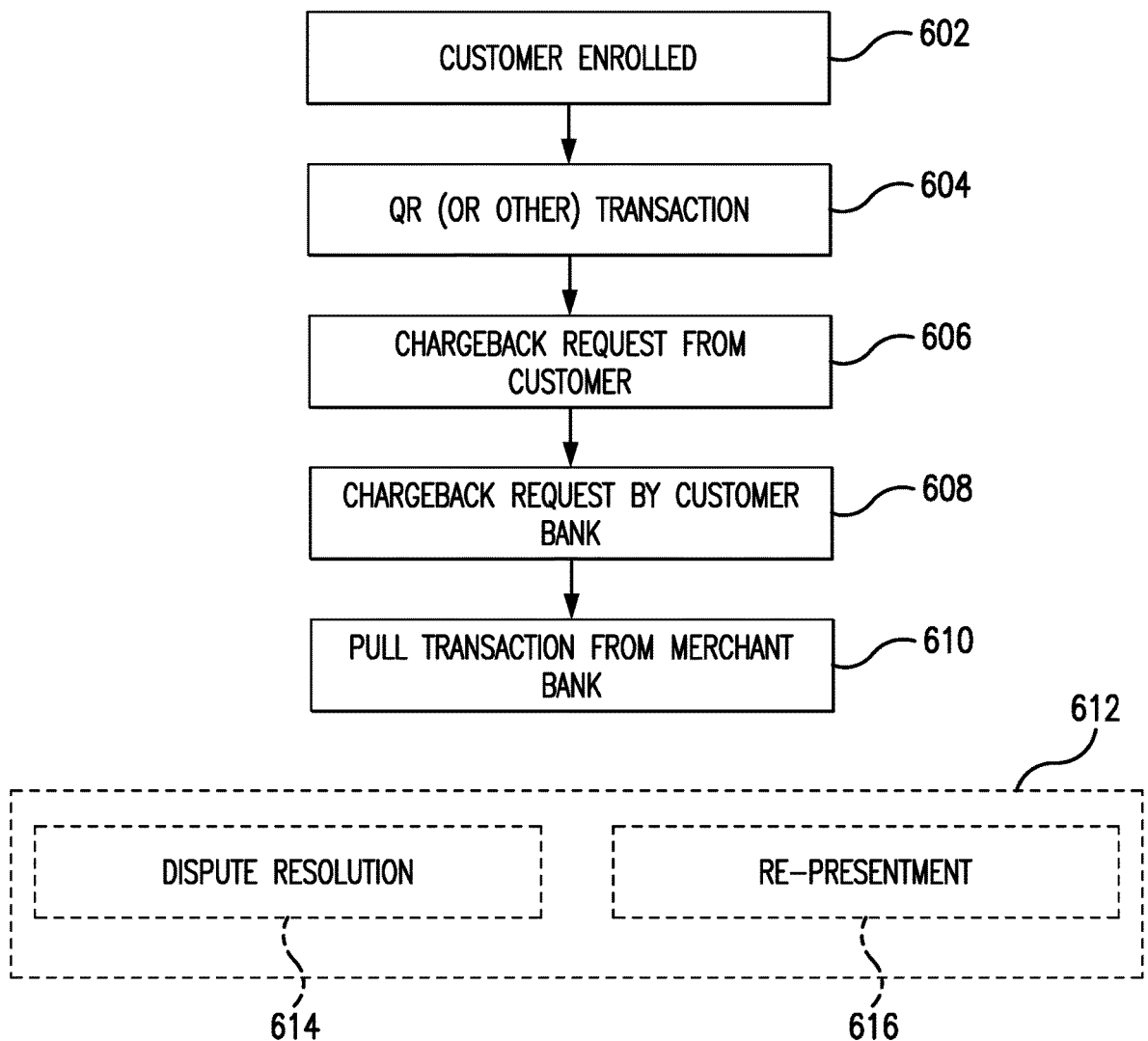
FIG. 6 is a flow chart that illustrates a process that may be performed in the system of FIG. 2 in accordance with some aspects of the disclosure.

FIG. 6 is a flow chart that illustrates a process that may be performed in the payment system 200 of FIG. 2 in accordance with some embodiments of the disclosure.

At 602 in FIG. 6, a user/customer may interact with the customer bank computer 300 in order to enroll in a service offering that allows the user to engage in P2M push transactions with merchants who accept payments in that manner. The user may designate his/her account at the customer bank to be the funding account for such transactions. The account may be, for example, a demand deposit account such as a savings or checking account.

In connection with the enrollment of the user, and the designation of his/her account for funding P2M payment transactions, a VCN may be associated with the account by the customer bank computer 300. In some embodiments, and/or in some situations, the customer bank itself may generate and assign the VCN. In other embodiments/situations, the customer bank may obtain the VCN to be associated with the user's account from the payment network 108*a*, via interaction between the customer bank computer 300 and the payment network computer 400. In some cases, the customer bank computer 300 may request the VCN from the payment network computer 400 via a suitable API (application programming interface), and the payment network computer 400 responds to the request by transmitting the VCN to the customer bank computer 300. In other cases, the customer bank computer 300 transmits the request for the VCN to the payment network computer 400 as a non-financial ISO message via the payment network transaction messaging channels. The VCN may be in the same format (e.g., 16 digits) as payment account numbers used in the payment card system.

At 604 in FIG. 6, the user engages in a P2M push payment transaction, as described, for example, in connection with FIG. 2. In some embodiments, the P2M push payment is initiated by the user/customer device scanning a QR code supplied by the merchant. In other embodiments, the customer device may receive the corresponding merchant information by other means, such as reading an RFID (radio frequency identification) device or beacon provided by the merchant, or via wireless communication from the merchant's device to the customer device. However initiated, the P2M push payment transaction may be completed in a known manner, concluding with a suitable notification to the merchant from the merchant bank.

At 606, the user may communicate with the customer bank (e.g., via a telephone call to a call center) to request a chargeback of the P2M payment transaction executed at 604. The user may take this step, for example, if goods purchased in the P2M transaction were damaged prior to delivery to the user, or not delivered, or if there was another failure on the merchant's part to provide the value agreed to between the merchant and user.

At 608, if the situation warrants, the customer bank may transmit a message to the payment network requesting a chargeback with respect to the P2M push transaction executed at 606. The chargeback message may be of a different type (having a different message type code) from chargebacks initiated by issuer banks in connection with typical merchant-initiated payment card network transactions. The chargeback message submitted at 608 may include both the PAN for the merchant's account to which the P2M payment was pushed, and the VCN associated with the user's account that funded the P2M transaction. For this particular chargeback message type, the payment network may refrain from applying the usual rule that the customer account number must be one that was issued by the bank requesting the chargeback. It is also to be noted that the bank which initiates the chargeback in this case is the same bank that initiated the transaction (i.e., the P2M transaction) that is being charged back. This is in contradistinction to the conventional chargeback situation, in which the issuer bank initiates a chargeback of a pull transaction that was previously initiated by the acquirer bank.

At 610, the payment network 108*a* executes a pull transaction to implement the requested chargeback. In the pull transaction, the funds originally pushed to the merchant's account at 604 are transferred from the merchant bank 212 to the customer bank 210. The pull transaction messaging may include the user account VCN as reference data. The customer bank 210 may apply its rules to the particular circumstances (including customer status, the monetary amount involved, the alleged facts underlying the customer's request for the chargeback, etc.) to determine whether to credit to the customer's account the funds received by the customer bank 210 at step 610.

Potential subsequent events are represented within phantom block 612. For example, at block 614, a dispute resolution process (including, for example, arbitration) may occur in the event that the merchant and/or the merchant bank contests the chargeback.

Another possible subsequent event—indicated at block 616—is a re-presentment transaction. This (if it occurs) is a pull transaction initiated by the merchant bank 212. According to the re-presentment transaction, the funds transferred from the merchant bank 212 to the customer bank 210 at 610 are transferred by the payment network 108a back from the customer bank 210 to the merchant bank 212. The payment network messaging for the re-presentment transaction may include the customer account VCN as reference data.

In some cases, both re-presentment and dispute resolution may take place concerning the same chargeback transaction.

From the foregoing discussion, it will be appreciated that the payment system 200 is a computerized, electronic, networked and distributed computer to computer messaging system that causes funds to be transferred from party to party by data messaging according to pre-arranged protocols provided in accordance with teachings of the present disclosure. The system 200 expands the capabilities of the payment system and provides enhanced data messaging features from computer to computer to support a chargeback feature not previously available in connection with P2M push payment transactions. Accordingly, the present disclosure provides a technological solution to the technological problem of providing data processing integration of chargeback processing into a P2M push payment system.

One particular benefit of the system 200 as described herein is that the chargeback transaction functionality adapts the P2M payment system to support chargebacks even when the funding account for the underlying transaction is not a payment card system account. Another notable feature is that the system 200 as described herein allows an electronic messaging chargeback transaction to be originated from the same customer bank computer that originated the underlying electronic messaging P2M push payment transaction.

Although chargeback messaging has been illustrated in the context of a disputed P2M push payment transaction, the teachings of this disclosure are also applicable to other contexts, such as calling back a P2P (person to person) funds transfer transaction.

Figure 7:
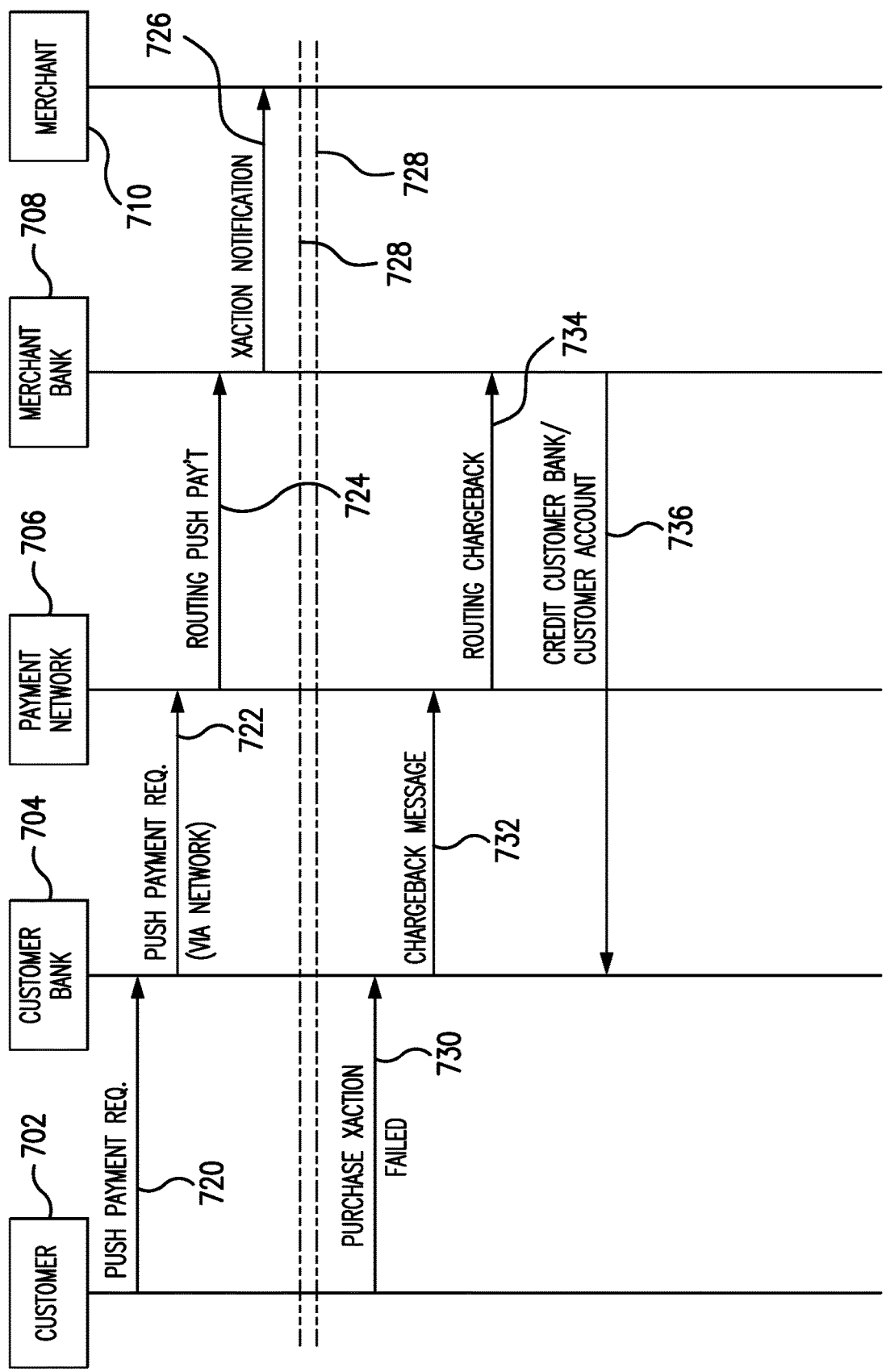
FIGS. 7 and 8 are diagrams that illustrate further aspects of operation of the payment transaction system of FIG. 2.

FIG. 7 is a diagram that illustrates further aspects of operation of the system 200. In particular, FIG. 7 illustrates a sequence of messages that culminate in a chargeback transaction according to aspects of the present disclosure.

In FIG. 7, blocks 702, 704, 706, 708, and 710 represent parties to a transaction illustrated in the drawing. Block 702 represents the customer; block 704 represents the customer bank; block 706 represents the payment network; block 708 represents the merchant bank; and block 710 represents the merchant.

At 720, the customer 702 sends a request for a push payment transaction to the customer bank 704. It may be presumed that this is in connection with a purchase transaction that is taking place between the customer 702 and the merchant 710. The push payment request may be initiated by the customer's mobile device (not shown apart from block 702) scanning a QR code presented or displayed by the merchant 710.

At 722, the customer bank 704 responds to the customer's request by transmitting to the payment network 706 a request for a push transaction to push the transaction amount from the customer's account at the bank 704 for the benefit of the merchant 710.

At 724, the payment network 706 routes the push transaction to the merchant bank 708 to cause the transaction amount to be credited to the merchant's account at the merchant bank 708.

At 726, the merchant bank 708 sends a notification to the merchant 710 to indicate that the push payment transaction has occurred. This may be via in-app messaging or via SMS, for example. With this notification, the merchant 710 knows that payment has successfully occurred, and the underlying purchase transaction can be concluded.

Following 726, there may be a lapse of time (perhaps a few days), as represented in the drawing by parallel horizontal dot-dash lines 728.

Following the lapse of time 728, the customer 702 becomes aware of a problem with the underlying purchase transaction—perhaps non-delivery of goods, a defect in the goods, a failure by the merchant to provide agreed upon services, etc. At 730, the customer 702 sends a message to the customer bank 704 to indicate that the underlying purchase transaction has failed and requesting that the customer bank take appropriate action.

At 732, the customer bank 704 sends a message to the payment network 706 requesting a chargeback transaction relative to the push payment transaction illustrated at 720-724. The message 732 may specify the merchant's card number, and also a VCN that has been associated with the customer's account at the customer bank 704. In contradistinction to customary practices, the payment network 706 may not require that the card number (in this case, the customer VCN) to benefit from the chargeback be one issued by the customer's issuing bank.

At 734, the payment network 706 routes the chargeback request to the merchant bank 708.

At 736, the funds to be charged-back are pulled from the merchant's account at the merchant bank 708 and credited to the customer's account at the customer bank 704.

A transaction/chargeback process like that shown in FIG. 7 may—for the customer—emulate the customer experience of charging back a credit card account transaction, even though in the transaction of FIG. 7 the original payment transaction may have been pushed from a bank deposit account belonging to the customer 702.

Figure 8:
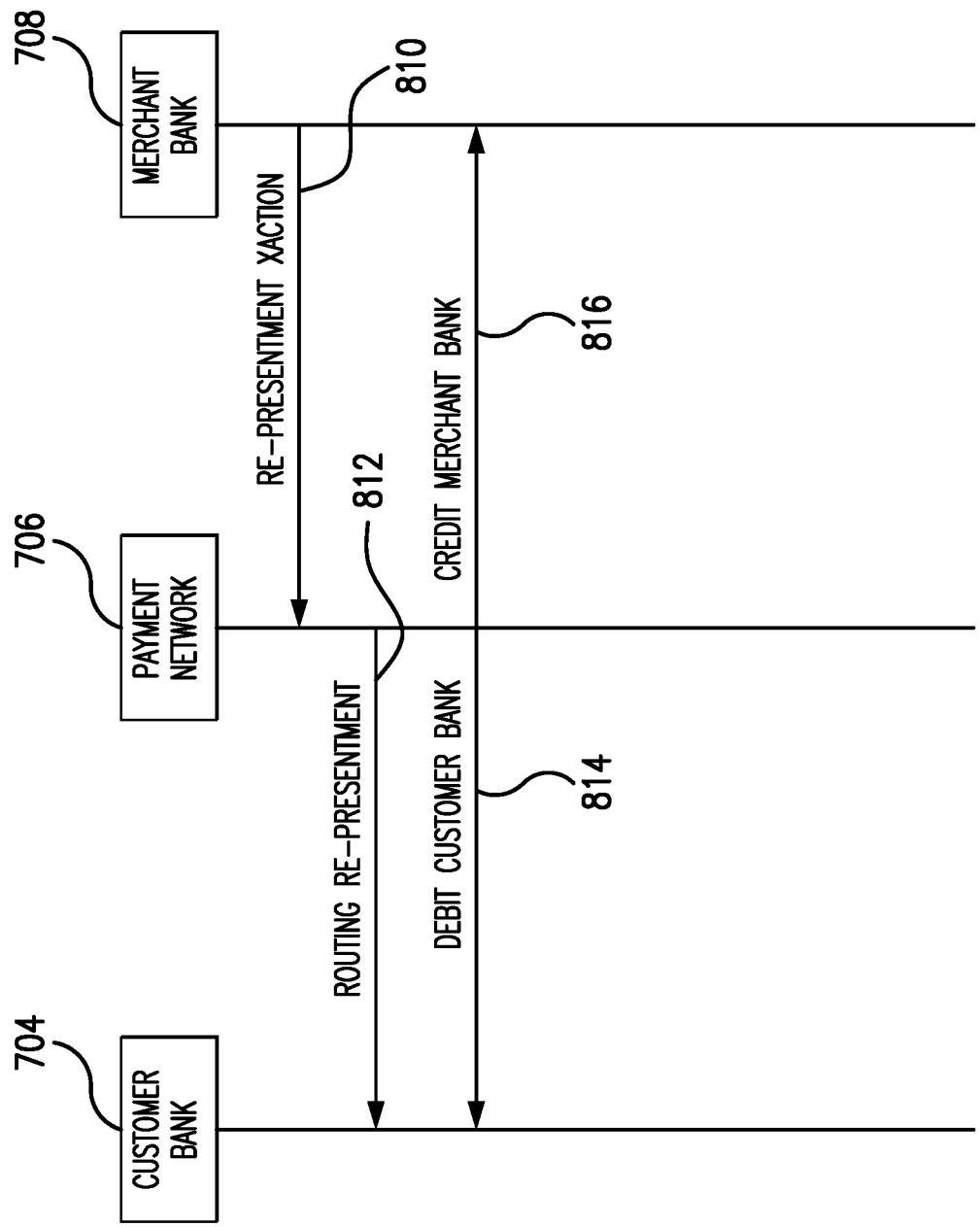

FIG. 8 is a diagram that illustrates further aspects of operation of the system 200. Specifically, FIG. 8 illustrates a sequence of messages involved in a re-presentment transaction. A re-presentment transaction may occur following a chargeback.

In FIG. 8, again block 704 represents the customer bank, block 706 represents the payment network and block 708 represents the merchant bank.

At 810 in FIG. 8, the merchant bank 708 may transmit a message to initiate a re-presentment transaction to request funds collected through a chargeback that was previously implemented by the customer bank 704.

At 812, the payment network 706 routes the re-presentment transaction to the customer bank 704. At 814, the payment network 706 debits the customer bank 704 by the amount of the re-presentment transaction, and at the same time, at 816, the payment network 706 credits the merchant bank 708 with the amount of the re-presentment transaction.

The above descriptions and illustrations of processes herein should not be considered to imply a fixed order for performing the process steps. Rather, the process steps may be performed in any order that is practicable, including the omission of one or more steps and/or the simultaneous performance of at least some steps.

As used herein and in the appended claims, the term "computer" should be understood to encompass a single computer or two or more computers in communication with each other.

As used herein and in the appended claims, the term "processor" should be understood to encompass a single processor or two or more processors in communication with each other.

Although the present disclosure has been described in connection with specific exemplary embodiments, it should be understood that various changes, substitutions, and alterations would be apparent to those skilled in the art and can be made to the disclosed embodiments without departing from the spirit and scope of the disclosure as set forth in the appended claims.

What is claimed is:

1. A method for initiating a push-to-merchant (P2M) chargeback by a customer mobile device for improving transaction security and reducing signaling between an issuer bank computing device and a merchant bank computing device of a merchant bank, the method comprising:
    requesting, by the issuer bank computing device of an issuer bank and via an application programming interface (API), a virtual card number (VCN), from a payment card system computer of a payment card system, fora demand deposit account owned by a customer at the issuer bank, the VCN being in a format for account numbers used in the payment card system;
    receiving, by the issuer bank computing device, the VCN, from the payment card system computer;
    associating the VCN with the demand deposit account owned by the customer, the associating being performed by the issuer bank computing device;
    receiving, at the issuer bank computing device, a push request for a push to merchant payment transaction to a merchant bank account of a merchant at the merchant bank, wherein the push request for the push to merchant payment transaction is received from the customer mobile device of the customer in response to the customer mobile device being located at a point of sale device for the merchant and performing at least one of: scanning a Quick Response (QR) code of the merchant, reading a radio frequency identification (RFID) device, or reading a beacon provided by the merchant;
    transmitting, by the issuer bank computing device to a merchant payment card system account, the push request for the push to merchant payment transaction;
    routing the push to merchant payment transaction, from the issuer bank computing device to the merchant payment card system account, to use the VCN as provided by the issuer bank computing device to transfer the funds via the payment card system computer for the push to merchant payment transaction from the demand deposit account to the merchant bank account;
    receiving, by the issuer bank computing device, a pull request, from the customer mobile device, fora charge back transaction relative to the push to merchant payment transaction;
    transmitting, by the issuer bank computing device, a pull transaction message corresponding to the pull request via the payment card system computer, the pull transaction message including the VCN and having a different type of charge back message code employed by issuer banks in the payment card system for initiating a chargeback as compared to a chargeback initiated by an acquirer bank used by the merchant in connection with merchant-initiated payment card network transactions; and
    pulling, via the payment card system computer, the funds corresponding to the pull request for the chargeback transaction from the merchant bank account for transfer to the demand deposit account based on the VCN;
    wherein the customer mobile device, via the issuer bank computing device, initiates the push request for the push to merchant payment transaction and the chargeback transaction.

2. An apparatus comprising:
a processor; and
a memory in communication with the processor, the memory storing program instructions, that when executed by the processor, are operative to perform functions comprising initiating a push-to-merchant (P2M) chargeback by a customer mobile device for improving transaction security and reducing signaling between an issuer bank computing device and a merchant bank computing device of a merchant bank, the functions further including:
    requesting, by the issuer bank computing device of a n issuer bank and via an application programming interface (API), a virtual card number (VCN), from a payment card system computer of a payment card system, for a demand deposit account owned by a customer at an issuer bank, the VCN being in a format for account numbers used in the payment card system in the payment card system;
    receiving, by the issuer bank computing device, the VCN, from the payment card system computer;
    associating the VCN with the demand deposit account owned by the customer, the associating being performed by the issuer bank computing device;
    receiving, at the issuer bank computing device, a push request for a push to merchant payment transaction to a merchant bank account of a merchant at the merchant bank, wherein the push request for the push to merchant payment transaction is received from the customer mobile device of the customer in response to the customer mobile device being located at a point of sale device for the merchant and performing at least one of: scanning a Quick Response (QR) code of the merchant, reading a radio frequency identification (RFID) device, or reading a beacon provided by the merchant;
    transmitting, by the issuer bank computing device to a merchant payment card system account, the push request being for the push to merchant payment transaction;
    routing the push to merchant payment transaction, from the issuer bank computing device to the merchant payment card system account, to use the VCN as provided by the issuer bank computing device to transfer the funds via the payment card system computer for the push to merchant payment transaction from the demand deposit account to the merchant bank account;
    receiving, by the issuer bank computing device, a pull request, from the customer mobile device, fora chargeback transaction relative to the push to merchant payment transaction;
    transmitting, by the issuer bank computing device, a pull transaction message corresponding to the pull request via the payment card system computer, the pull transaction message including the VCN and having a different type of chargeback message code employed by issuer banks in the payment card system for initiating a chargeback as compared to a chargeback initiated by an acquirer bank used by the merchant in connection with merchant-initiated payment card network transactions; and pulling, via the payment card system computer, the funds corresponding to the pull request for the chargeback transaction from the merchant bank account for transfer to the demand deposit account based on the VCN;

wherein the customer mobile device, via the issuer bank computing device, initiates the push request for the push to merchant payment transaction and the chargeback transaction.

3. A non-transitory computer-readable storage medium storing program instructions executable by a processor to perform functions comprising initiating a push-to-merchant (P2M) chargeback by a customer mobile device for improving transaction security and reducing signaling between an issuer bank computing device and a merchant bank computing device of a merchant bank, the functions further comprising:

requesting, by the issuer bank computing device of a n issuer bank and via an application programming interface (API), a virtual card number (VCN), from a payment card system computer of a payment card system, fora a demand deposit account owned by a customer at the issuer bank computing device, the VCN being in a format for account numbers used in the payment card system;

receiving, by the issuer bank computing device, the VCN, from the payment card system computer;

associating the VCN with the demand deposit account owned by the customer, the associating being performed by the issuer bank computing device;

receiving, at the issuer bank computing device, a push request for a push to merchant payment transaction to a merchant bank account of a merchant at the merchant bank, wherein the push request for the push to merchant payment transaction is received from the customer mobile device of the customer in response to the customer mobile device being located at a point of sale device for the merchant and performing at least one of: scanning a Quick Response (QR) code of the merchant, reading a radio frequency identification (RFID) device, or reading a beacon provided by the merchant;

transmitting, by the issuer bank computing device to a merchant payment card system account, the push request being for the push to merchant payment transaction;

routing the push payment transaction, from the issuer bank computing device to the merchant payment card system account, to use the VCN as provided by the issuer bank computing device to transfer the funds via the payment card system computer for the push to merchant payment transaction from the demand deposit account to the merchant bank account;

receiving, by the issuer bank computing device, a pull request, from the customer mobile device, fora charge back transaction relative to the push to merchant payment transaction;

transmitting, by the issuer bank computing device, a pull transaction message corresponding to the pull request via the payment card system computer, the pull transaction message including the VCN and having a different type of charge back message code employed by issuer banks in the payment card system for initiating a chargeback as compared to a chargeback initiated by an acquirer bank used by the merchant in connection with merchant-initiated payment card network transactions; and pulling, via the payment card system computer, the funds corresponding to the pull request for the chargeback transaction from the merchant bank account for transfer to the demand deposit account based on the VCN;

wherein the customer mobile device, via the issuer bank computing device, initiates the push request for the push to merchant payment transaction and the chargeback transaction.

* * * * *